United States Patent [19]

Tanaka

[11] Patent Number: 5,740,187
[45] Date of Patent: Apr. 14, 1998

[54] DATA PROCESSING USING INTERPOLATION OF FIRST AND SECOND INFORMATION BASED ON DIFFERENT CRITERIA

[75] Inventor: Mitsugu Tanaka, Kawasaki, Japan

[73] Assignee: Canon Kabushiki Kaisha, Tokyo, Japan

[21] Appl. No.: 72,093

[22] Filed: Jun. 7, 1993

[30] Foreign Application Priority Data

Jun. 9, 1992 [JP] Japan .................................. 4-149382

[51] Int. Cl.$^6$ .................................................. G11B 20/18
[52] U.S. Cl. ...................... 371/37.4; 371/37.7; 371/40.3; 371/40.16
[58] Field of Search .......................... 371/31, 37.4, 37.5, 371/37.7, 40.1, 40.4, 40.3, 40.16; 360/19.1

[56] References Cited

U.S. PATENT DOCUMENTS

| | | | |
|---|---|---|---|
| 4,882,732 | 11/1989 | Kaminaga | 371/2.2 |
| 4,914,527 | 4/1990 | Asai et al. | 360/10.3 |
| 5,148,487 | 9/1992 | Nagai et al. | 381/46 |
| 5,239,430 | 8/1993 | Koishikawa et al. | 360/77.13 |
| 5,309,290 | 5/1994 | Sugiyama et al. | 360/32 |
| 5,311,372 | 5/1994 | Matsumi et al. | 360/19.1 |

*Primary Examiner*—Stephen M. Baker
*Attorney, Agent, or Firm*—Fitzpatrick, Cella, Harper & Scinto

[57] ABSTRACT

A data reproducing apparatus having: an error correcting circuit for correcting an error in an error correcting block in accordance with an error correcting code, the error correcting block including main information, at least one type of subsidiary information, an error detecting code at least for the main information, and the error correcting code for the main and subsidiary information and the error detection code; a flag memory circuit for storing an uncorrectable error flag to be set by the error correcting circuit for the at least one type of subsidiary information; a first interpolation circuit for interpolating the main information to correct an error in accordance with the decoding result by the error detecting code; and a second interpolation circuit for interpolating the at least one type of subsidiary information to correct an error in accordance with the uncorrected error flag stored in the flag memory circuit.

7 Claims, 3 Drawing Sheets

DATA PROCESSING USING INTERPOLATION OF FIRST AND SECOND INFORMATION BASED ON DIFFERENT CRITERIA

BACKGROUND OF THE INVENTION

1. Field of the Invention

The present invention relates to a data reproducing apparatus, and more particularly to a data reproducing apparatus for a system for transferring (recording/reproducing) moving image and audio information in the form of digital signals.

2. Related Background Art

A technique of data transmission via a communication line to a remote area is used also for an apparatus which digitally records/reproduces information to/from a recording medium such as magnetic tapes, magnetic disks, and optical disks. For example, there is known a digital recording/reproducing apparatus (or digital VTR) for digitally recording/reproducing moving image signals and audio signals to/from a magnetic tape. With these apparatuses, generally an error correcting code is used to correct an error generated during data transmission.

In a digital VTR in particular, an interpolation circuit is generally used in order to ensure the quality of reproduced signals to some degree even if the number of errors exceeds the error correcting capability of error correcting codes. It is also known to add an error detecting code such as CRCC in addition to the error correcting code in order to improve the error detecting capability.

Although the length of an error correction block is constant, the information amount of image or video data and audio data per unit time is generally different. As a result, the error correcting capability for the constant length error correction block changes with time, often sacrificing audio data. In other words, the probability of interpolating audio data becomes higher than that of interpolating video data, because the amount of audio data in an error correction block is smaller than the amount of video data in the block.

SUMMARY OF THE INVENTION

It is an object of the present invention to provide a data reproducing apparatus solving the above disadvantages.

A data reproducing apparatus of an embodiment of the present invention includes: error correcting means for correcting an error in an error correcting block in accordance with an error correcting code, the error correcting block including main information, at least one type of subsidiary information, an error detecting code at least for the main information, and the error correcting code for the main and subsidiary information and the error detection code; flag memory means for storing an uncorrectable error flag to be set by the error correcting means for at least one type of the subsidiary information; first interpolation means for interpolating the main information to correct an error in accordance with the decoding result by the error detecting code; and second interpolation means for interpolating at least one type of the subsidiary information to correct an error in accordance with the uncorrectable error flag stored in the flag memory means.

According to the embodiment, the subsidiary information is interpolated in accordance with the uncorrectable error flag for the error correcting code for the subsidiary information. Namely, the subsidiary information will not be interpolated in accordance with the uncorrectable error flag for the main information. It is therefore possible to inhibit the interpolation of the subsidiary information in response to an uncorrectable error in the main information. The main information is interpolated in accordance with the decoding result of the error detecting code.

DETAILED DESCRIPTION OF THE PREFERRED EMBODIMENTS

An embodiment of the present invention will be described with reference to the accompanying drawings.

Figure 1:
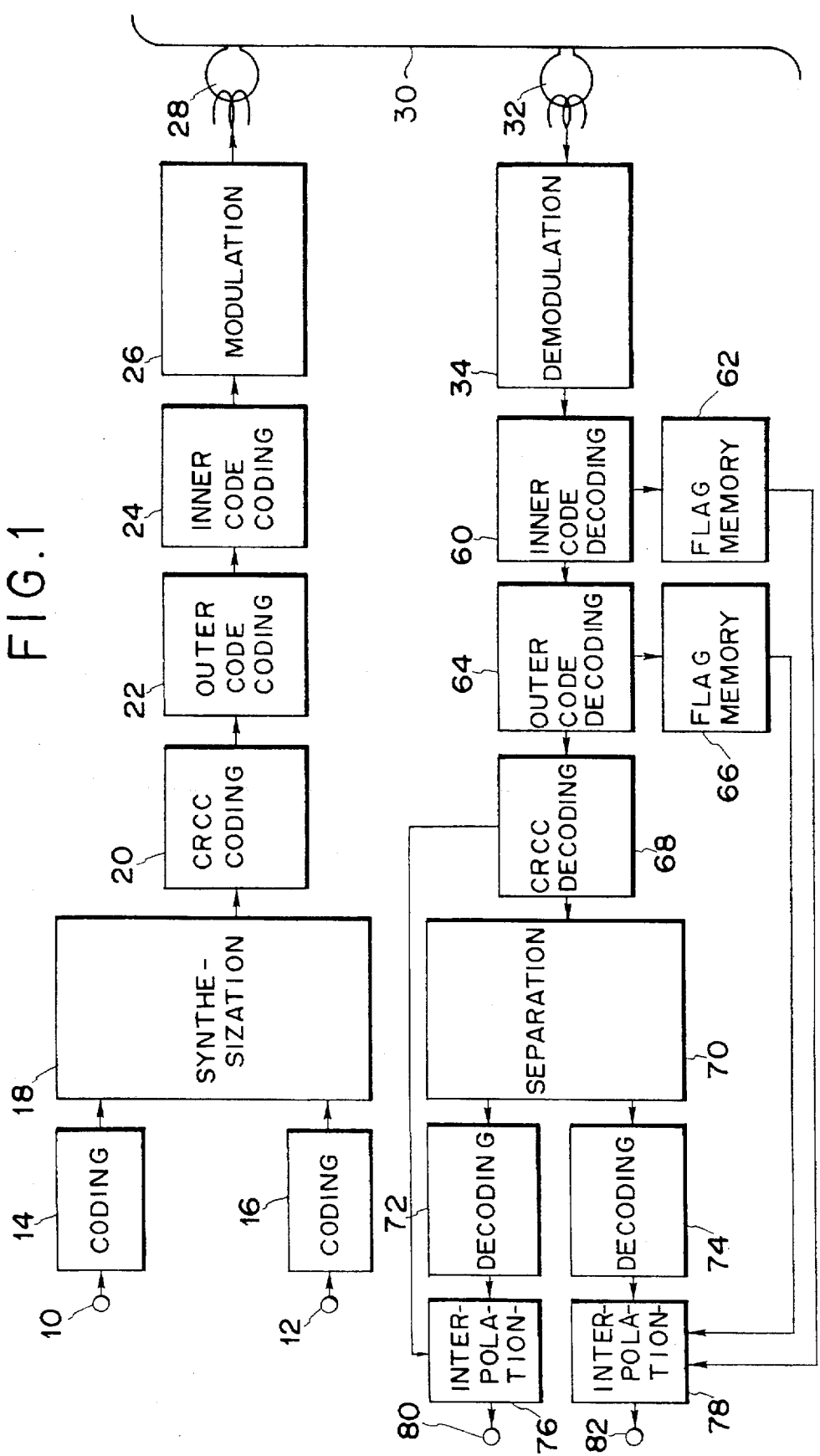
FIG. 1 is a block diagram showing the structure of an embodiment of the present invention.

FIG. 1 is a block diagram showing the structure of an embodiment of the present invention applied to a digital VTR.

In this embodiment, the error detecting capability of inner and outer codes is used to judge from inner and outer uncorrectable error flags whether an uncorrectable error has occurred in reproduced audio signals. If an uncorrectable error may be in the audio signals, they are interpolated. Video signals are interpolated based upon the decoding result of CRCC codes.

Referring to FIG. 1, an input terminal 10 is supplied with a digital moving image or video signal such as a TV signal, and an input terminal 12 is supplied with a digital audio signal. A coding circuit 14 compresses and encodes the digital video signal supplied from the input terminal, by using a preceding value predicted difference coding scheme or a DCT coding scheme. If a DPCM or a DCT coding scheme is used by the coding circuit 14, a predetermined pixel (e.g., a start pixel of one line) is used as a reset value for the predicted difference coding scheme to output PCM codes.

Another coding circuit 16 encodes the digital audio signal supplied from the input terminal 12, by using a PCM coding scheme for example.

Figure 2:
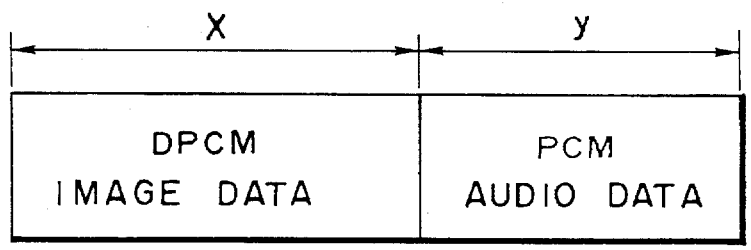
FIG. 2 shows the data structure of an output of a synthesizing circuit.
Figure 3:
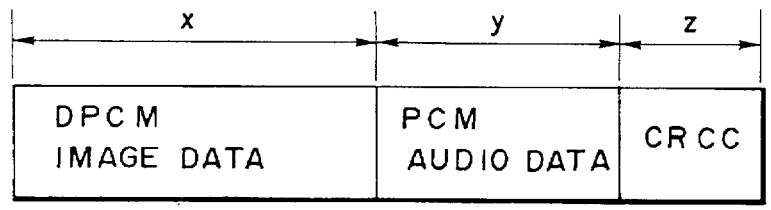
FIG. 3 shows the data structure of an output of a CRCC coding circuit.
Figure 4:
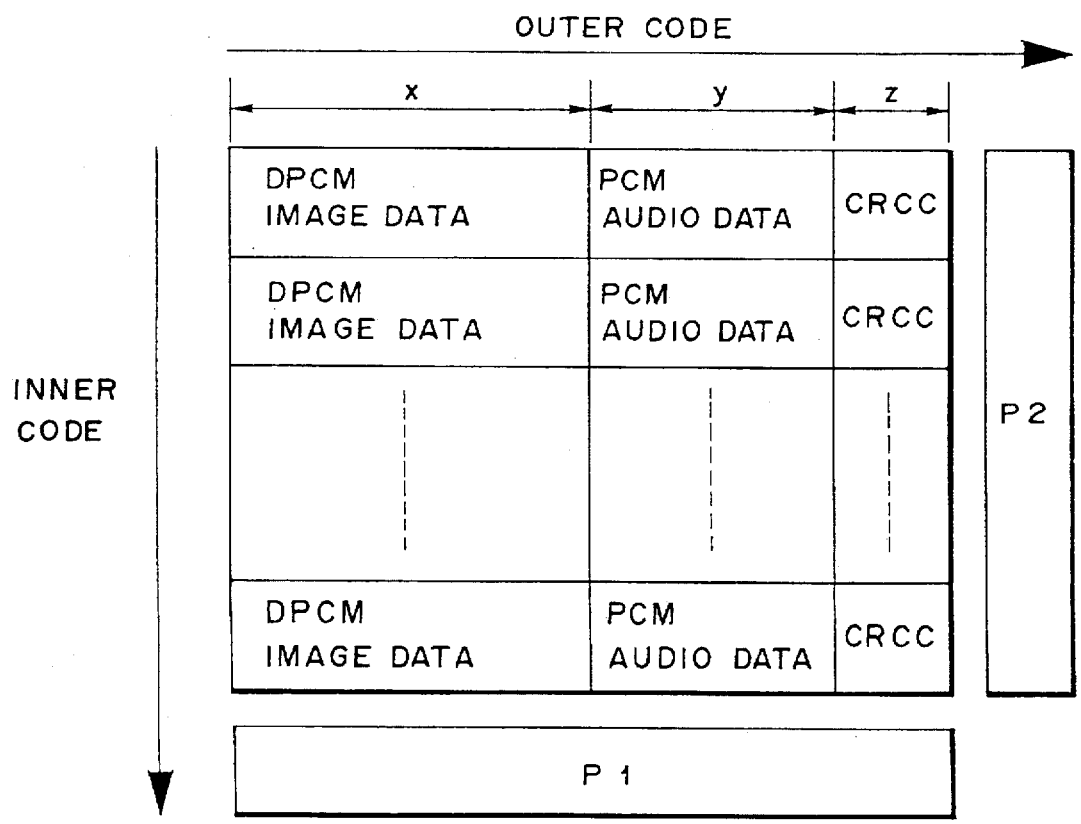
FIG. 4 shows the data structure of an error correcting block.

A time axis conversion synthesizing circuit 18 converts the codes encoded by the coding circuit 16 relative to the time axis, and synthesizes them with the codes encoded by the coding circuit 14, as shown in FIG. 2. Namely, video information (data length x) and audio information (data length y) are synthesized with respect to the time axis. A CRCC adding circuit 20 adds error detecting codes CRCC of a data length z to the synthesized data shown in FIG. 2, as shown in FIG. 3. An inner code coding circuit 22 and an outer code coding circuit 24 generate an error correcting code such as double coding Reed Solomon codes and add them to the group of the video data, audio data, and CRCC codes respectively shown in FIG. 3. FIG. 4 shows the data structure after the error correcting coding. P1 represents an outer code parity, and P2 represents an inner code parity. The outer code is generated in the horizontal scan direction, and the inner code is generated in the vertical direction for a predetermined number of horizontal scan lines.

A modulator circuit 26 modulates an output of the inner code coding circuit 24, i.e., a data train such as shown in FIG. 4 to record the data on a magnetic tape 30 by means of a recording rotary head 28.

In the reproducing system, the data recorded on the magnetic tape 30 is read by a reproducing rotary head, demodulated by a demodulator circuit 34, and supplied to an inner code decoding circuit 69.

The inner code decoding circuit 60 decodes the inner code parity P1 in the reproduced data to correct errors. The inner code decoding circuit 60 detects presence or absence of an uncorrectable error only in the audio data, and sets an uncorrectable error flag in a flag memory 62 at a corresponding location. An uncorrectable error in the video data is not written in the flag memory 62 because an error in the video data can be detected using CRCC codes. The capacity required for the flag memory 62 can thus be reduced.

An outer code decoding circuit 64 decodes the outer code parity P2 to correct any error still resident in the data error-corrected by the inner code decoding circuit 60. The outer code decoding circuit 64 detects presence or absence of an uncorrectable error, and sets an error detecting flag in a flag memory 66 at a corresponding location.

Using error detecting codes CRCC of the video and audio information error-corrected by the inner and outer code decoding circuits 60 and 64, a CRCC decoding circuit 68 detects any error in the video and audio data. If there is any error in the video data and audio data an error detecting signal is supplied to an interpolation circuit 76.

The CRCC decoding circuit 68 supplies the video and audio data to a separation circuit 70. The separation circuit 70 supplies the video data to a decoding circuit 72, and the audio data to another decoding circuit 74 after converting it with respect to the time axis. The decoding circuit 72 decodes the encoded image data to recover the image data and supplies it to the interpolation circuit 76. The decoding circuit 74 decodes the encoded audio data to supply the decoded audio data to another interpolation circuit 78.

When an uncorrectable error is generated in the electromagnetic conversion system, in response to the error detecting signal from the CRCC decoding circuit 68, the interpolation circuit 76 interpolates an output of the decoding circuit 72 by using data of one line before or after.

On the other hand, when both the outer and inner code error detecting flags are set in the flag memories 62 and 66, the interpolation circuit 78 interpolates the data by using the held preceding value or the like. The inner code uncorrectable error flag is not set even if an uncorrectable error is generated in the video data. Therefore, if an uncorrectable error is not generated in the audio data, the interpolation circuit 78 will not interpolate even if an uncorrectable error is generated in the video data in the outer code coding direction. It is therefore possible for the interpolation circuit 78 not to unnecessarily interpolate the reproduced audio signal.

A digital video signal interpolated, if necessary, by the interpolation circuit 76 is outputted from an output terminal 80, and a digital audio signal interpolated, if necessary, by the interpolation circuit 78 is outputted from an output terminal 82.

In the above embodiment, image or video information and audio information are transmitted (recorded and reproduced) illustratively as the main and subsidiary information. It is obvious that piano code information or character information may be used as the subsidiary information, or a plurality of audio information may be used.

Error correcting coding is not limited to the embodiment schemes, but other various coding schemes may also be used.

A digital VTR has been used for the description of the invention. The present invention is also applicable to other data communications via communication lines such as ISDN. The data transmission apparatus used in this specification includes recording/reproducing apparatuses for recording/reproducing information to/from a recording medium such as magnetic tapes, magnetic disks, optical disks, and magnetooptic disks.

As readily appreciated from the foregoing description, it is possible to avoid unnecessary interpolation of subsidiary information to be caused by an uncorrectable error in main information.

What is claimed is:

1. A data processing apparatus comprising:

(a) receiving means for receiving first and second information data having a different information amount with error detection check codes and error correction check codes, in units of a block, where each block which includes first and second information data also includes the error detection check codes, the error detecting check codes include outer codes of a product code and inner codes of the product code, the outer codes are included in each block including first and second information data, and the inner codes are able to detect that an uncorrectable error exists in a unit other than the block;

(b) error correction means for correcting errors in the first and second information data by using the error correction check codes and for generating an error flag when an uncorrectable error exists;

(c) error detection means for detecting errors in each block by using the error detection check codes included, in that block;

(d) first error concealing means for concealing errors in the first information data in a unit of the block according to an output of said error detection means; and (e) second error concealing means for concealing errors in the second information data according to the error flag.

2. An apparatus according to claim 1, wherein said second error concealing means conceals errors according to the error flag which is generated based on the inner codes.

3. An apparatus according to claim 1, wherein said second error concealing means conceals errors according to the error flags which are generated based on the outer codes and the inner codes.

4. An apparatus according to claim 1, wherein the inner codes are included in blocks which do not contain the first and second information.

5. An apparatus according to claim 1, wherein the first information data include video data and the second information data include audio data.

6. An apparatus according to claim 1, wherein said second concealing means includes memory means for storing the error flags.

7. A data processing method comprising the steps of:

(a) receiving first and second information data having a different information amount with error detection check codes and error correction check codes in units of a block, where each block including first and second information data also includes the error detection check codes, the error correction check codes include outer codes of a product code and inner codes of the product code, the outer codes are included in each block including first and second information data, and the inner codes are able to detect that an uncorrectable error exists in a unit other than the block;

(b) correcting errors in the first and second data by using the error correction check code and for generating an error flag when an uncorrectable error exists;

(c) detecting errors in each block by using the error detection check codes included therein;

(d) concealing errors in the first information data in a unit of the block according to an output of said error detection means; and (e) concealing errors in the second information data according to the error flag.

\* \* \* \* \*